United States Patent [19]

Bartholic et al.

[11] 4,284,494
[45] Aug. 18, 1981

[54] CONTROL OF EMISSIONS IN FCC REGENERATOR FLUE GAS

[75] Inventors: David B. Bartholic, Watchung; John W. Byrne, Saddle Brook, both of N.J.

[73] Assignee: Engelhard Minerals & Chemicals Corporation, Edison, N.J.

[21] Appl. No.: 901,346

[22] Filed: May 1, 1978

[51] Int. Cl.³ .................. C10G 11/14; B01J 37/12
[52] U.S. Cl. .................. 208/164; 208/113; 252/417; 423/244
[58] Field of Search .................. 208/113, 120, 164; 252/416, 417; 423/244, 328

[56] References Cited

U.S. PATENT DOCUMENTS

| | | | |
|---|---|---|---|
| 2,476,143 | 7/1949 | Gullette | 208/164 |
| 4,010,094 | 3/1977 | McKinney | 208/164 |
| 4,064,037 | 12/1977 | Graven et al. | 208/164 |
| 4,064,039 | 12/1977 | Penick | 208/164 |
| 4,093,537 | 6/1978 | Gross et al. | 208/164 |
| 4,115,249 | 9/1978 | Blanton et al. | 208/120 |

Primary Examiner—T. M. Tufariello
Attorney, Agent, or Firm—Inez L. Moselle

[57] ABSTRACT

A system is described for control of sulfur oxide in emissions to the atmosphere from regenerators of Fluid Catalytic Cracking Units (FCC) in a manner which provides an added controllable variable in heat balanced units. The cracking catalyst used has the capability of reversibly reacting with sulfur oxides in the regenerator flue gas to carry the sulfur back into the reactor where it is converted, at least in part, to hydrogen sulfide which is removed from reaction products in the normal course of treating the cracked products from the reactor. By the disclosed system, regenerator flue gas is cooled and then contacted with hot regenerated catalyst from the regenerator for sorption of sulfur oxides by the catalyst and to cool the catalyst for control of reaction parameters in the FCC reactor.

5 Claims, 1 Drawing Figure

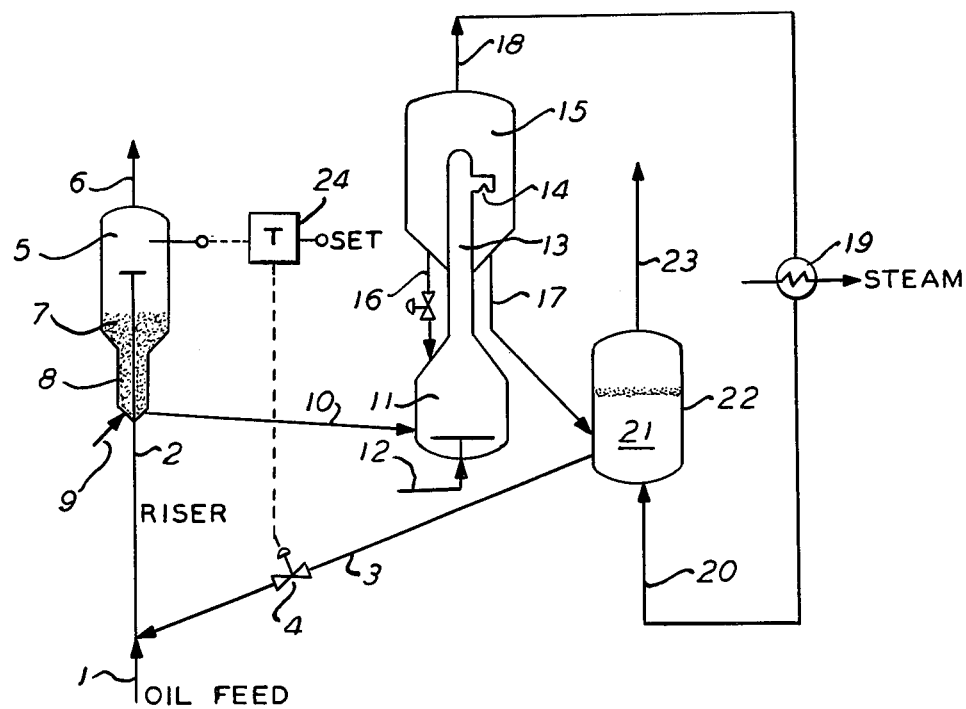

CONTROL OF EMISSIONS IN FCC REGENERATOR FLUE GAS

FIELD OF THE INVENTION

The invention is concerned with operation of FCC units for control of undesirable gases in the flue gas released from the regenerators. More particularly, the invention provides an improvement on the known techniques for removal or conversion of sulfur oxides in a manner to accommodate maximum conversion of carbon monoxide and maximum coke burning (maximum catalyst activity) without adverse effect on the cracking reaction. The invention contemplates utilization of the control features to promote enhanced efficiency of the cracking reaction by providing an independent control over catalyst to oil (C/O) ratio in the reactor.

BACKGROUND OF THE INVENTION

During development of increasingly efficient systems since introduction in the 1930's, catalytic cracking has been characterized by certain basic steps repeated in cyclic manner. The catalysts are primarily combinations of silica and alumina. Other combinations of oxides have been shown to be effective; these others have not achieved continued commercial usage over any substantial period of time. The highly porous catalysts are characteristically possessed of extensive surface area of acidic nature. During a relatively short period of time, hydrocarbon charge, such as gas oil, undergoes profound conversions of complex nature on contact with those surfaces at elevated temperatures upwards of about 850° F. and essentially atmospheric pressure. The temperature may range up to about 1000° F. and the pressure on incoming charge is usually only enough to overcome pressure drop through the reactor and associated product recovery facilities, say 30 to 50 psig.

The conversions taking place in the presence of the cracking catalyst include scission of carbon-to-carbon bonds (simply cracking), isomerization, polymerization, dehydrogenation, hydrogen transfer and others leading to lighter, lower molecular weight compounds as important desired products. In many installations motor gasoline of end point near about 400° F. is a primary product and cracking units are often operated to maximize high quality gasoline within constraints imposed by ability to profitably market the unavoidable by-products such as butane and lighter. In addition to the gaseous by-products, the reactions on cracking catalyst also produce hydrocarbons of very low volatility and very high carbon content which remain on the active surfaces of the catalyst and mask the active sites, rendering the catalyst inactive. Those deposits of heavy carbonaceous matter (commonly called "coke") can be removed by burning with air to restore the active surface and thus regenerate the activity of the catalyst. In commercial plants for practice of catalytic cracking, catalyst inactivated by coke is purged of volatile hydrocarbons, as by steaming, and contacted with air at elevated temperature to burn off the coke.

Combustion of the coke generates carbon dioxide, carbon monoxide and water as combustion products and releases large amounts of heat. To a very considerable extent, the heat so released has been applied to supply the endothermic heat of reaction during the cracking phase of the cycle. In its earliest stages, catalytic cracking was conducted in fixed beds of catalyst provided with heat exchange tubes through which a heat transfer fluid was circulated to abstract heat during regeneration and supply heat during cracking. Continuity of operation was achieved by a complex system of manifolds and valves serving a plurality of reactors such that one is used for cracking while two or more others were purged of volatiles, regenerated, again purged and ready to assume the cracking function as catalyst in the first reactor became spent.

Further development made available systems in which the catalyst is moved continuously through a reactor, purged, transferred to a regenerator, again purged and returned to the reactor. These moving catalyst systems are able to dispense with the circulating heat transfer medium and instead employ the catalyst itself as a medium for conveying heat from the regenerator to the reactor. The early catalysts such as acid treated clays, and synthetic amorphous silica-alumina composites resulted in deposition of quantities of coke in excess of the amounts which on complete combustion to carbon dioxide and water will supply the heat of reaction required by the reactor. In some installations, a portion of the heat was withdrawn by heat exchange coils in the regenerator. That practice was followed in the moving compact bed process known as Thermofor Catalytic Cracking (TCC). Another expedient is to circulate a portion of catalyst from the regenerator through a cooling heat exchanger and back to the regenerator. That practice was found suitable for systems in which a finely divided catalyst is suspended in the hydrocarbon charge in the reactor and in the combustion air in the regenerator. These suspended catalyst systems applied the fluidized solids phenomenon and are classed generally as Fluid Catalytic Cracking (FCC).

Characteristic of all the systems for many years was a high content of carbon monoxide (CO) in the flue gas from the regenerator, a result of incomplete combustion or partial utilization of the fuel value of the coke. CO in the flue gas is undesirable for other reasons. That combustible gas can burn in regenerator gas discharge equipment and in flues leading to temperatures which damage those facilities. The loss of potential fuel value has been avoided by providing "CO boilers" in which the CO is burned in contact with steam generation tubes, thus recovering sensible heat from the flue gas as well as fuel value of the CO.

As designs of moving catalyst systems for charging heavier stocks were developed, the cracker received some hydrocarbons in liquid form, requiring heat input for vaporization of charge, heating the charge to reaction temperature and for endothermic heat of reaction. The "heat balanced" FCC design aids in satisfaction of these requirements. Typically, that design provides a heat sensor in the reacted vapors before removal from the reactor. An automatic control of the valve in the line for return of hot regenerated catalyst from the regenerator to the reactor assures return of that amount of hot regenerated catalyst which will maintain reactor top temperature at a desired set point. It will be seen that this control also sets an important reactor parameter, namely ratio of catalyst to oil (C/O), corresponding to space velocity in fixed bed reactors. It follows that, for a given set of regenerator conditions, C/O is a dependent variable not subject to independent control by the operator.

The advent of zeolite cracking catalyst as described in U.S. Pat. No. 3,140,249 introduced new considerations in catalytic cracking design and practice. Such catalysts are highly active, inducing more profound conversion of hydrocarbon charge stock than the older catalysts. In addition, they are more selective in that a larger proportion of the conversion products are motor gasoline components with lesser proportions of gas and coke. Because of that increased selectivity, the zeolite cracking catalyst rapidly became the catalyst of choice, particularly in areas of high gasoline demand, such as the United States. The more active catalyst has been effectively applied in FCC Units at short catalyst contact times, such as the modern riser reactor units in which hot catalyst is dispersed in a column of charge rising through a conduit to an enlarged catalyst disengaging zone. Contact times of 20 seconds or less are common practice in such units. Such short contact times place a premium on high activity of the catalyst. Since activity of the regenerated catalyst is a function of residual coke remaining on the catalyst after regeneration, it becomes important to reduce residual coke to the lowest level economically attainable.

The extent of coke burning is a function of time and temperature. Rate of coke burning increases with increased temperature. In any given installation, the volume of the regenerator imposes a constraint on time of contact between catalyst and regeneration air. Temperature of regeneration is constrained by thermal stability of the catalyst which suffers unduly rapid loss of activity on exposure to moisture of the regeneration air at temperatures upwards of about 1400° F. In addition, the regeneration temperature must be held to a level which will not cause damage to vessel internals. As regeneration gas rises from a dense bed in a regenerator, burning of CO can take place in a "dilute phase" containing only a small amount of catalyst. Because there is very little catalyst to absorb the heat thus released, the temperature of the gas rises rapidly and may reach levels which cause damage to the cyclones which separate entrained catalyst from regenerator fume, plenum chambers and flues for discharge of the flue gas. This may be combated by injecting water or steam to these internals.

Better techniques have been recently proposed and adopted in many plants. According to the system of U.S. Pat. No. 3,909,392, catalyst from the dense bed of the regenerator is educted through tubes to the disperse phase thus providing catalyst mass to absorb heat of CO combustion and return that heat to the dense bed as the catalyst falls back into that bed. A widely practiced technique causes CO combustion to take place in the dense bed by use of a catalyst promoted with platinum or the like in very small amounts. See U.S. Pat. No. 4,072,600. By transferring the heat of burning CO to the dense bed, these developments make higher regeneration temperatures available to regenerate catalyst to lower residual coke levels, hence higher activity.

Regeneration temperatures about 1250° F., preferably around 1300° F. and up to about 1375° F. become feasible at residual coke levels of 0.1% by weight on catalyst. The necessary result of regeneration at these increased temperatures is that the automatic control to maintain preset reactor top temperature will reduce the rate of catalyst flow from regenerator to reactor below the rates for lower regeneration temperature, thus reducing C/O. In addition, catalyst at these high temperatures will heat a portion of the charge to excessive levels at which thermal cracking occurs with resultant production of gas, olefins, and coke.

Operators of FCC Units have also been concerned about emissions of sulfur dioxide and sulfur trioxide ($SO_x$) in the regenerator flue gas. The hydrocarbon feeds processed in commercial FCC units normally contain sulfur. It has been found that about 2–10% or more of the sulfur in a hydrocarbon stream processed in an FCC system is transferred from the hydrocarbon stream to the cracking catalyst, becoming part of the coke formed on the catalyst particles within the FCC cracking or conversion zone. Thus sulfur is eventually removed from the conversion zone on the coked catalyst which is sent to the FCC regenerator. Accordingly, about 2–10% or more of the feed sulfur is continuously passed from the conversion zone into the catalyst regeneration zone with the coked catalyst in an FCC unit.

In an FCC catalyst regenerator, sulfur contained in the coke is burned, along with the coke carbon, forming primarily gaseous sulfur dioxide and sulfur trioxide. These gaseous sulfur compounds become part of the flue gas produced by coke combustion and are conventionally removed from the regenerator in the flue gas.

It has been shown that $SO_x$ in the regenerator flue gas can be substantially cut back by including in the circulating catalyst inventory an agent capable of reacting with an oxide of sulfur in an oxidizing atmosphere or an environment which is not of substantial reducing nature to form solid compounds capable of reduction in the reducing atmosphere of the FCC reactor to yield $H_2S$. Upon such reduction, the sulfur leaves the reactor as gaseous $H_2S$ with the products of cracking. Those cracking products normally contain $H_2S$ and organic compounds of sulfur resulting from the cracking reaction. Since these sulfur compounds are detrimental to the quality of motor gasoline and fuel gas by-products, the catalytic cracker is followed by downstream treating facilities for removal of sulfur compounds. Thus the gaseous fractions of cracked product may be scrubbed with an amine solution to absorb $H_2S$ which is then passed to facilities for conversion to elemental sulfur, e.g., a Claus plant. The additional $H_2S$ added to the cracker product stream by chemical reduction in the reactor of the solid sulfur compounds formed in the regenerator imposes little additional burden on the sulfur recovery facilities.

The agent circulated with the catalyst inventory for removal of sulfur may be an integral part of the cracking catalyst particles or may be constituted by separate particles having essentially the same fluidization properties as the cracking catalyst. Suitable agents for the purpose have been described in a number of previously published documents. Discussion of a variety of oxides which exhibit the property of combining with $SO_x$ and thermodynamic analysis of their behavior in this regard are set out by Lowell et al., Selection of Metal Oxides for Removing $SO_x$ From Flue Gas, Ind. Eng. Chem. Process Des. Develop., Vol. 10, No. 3 at pages 384–390 (1971). Behavior of alumina for removal of $SO_x$ from FCC flue gas is described in U.S. Pat. No. 4,071,436, the entire disclosure of which is hereby incorporated herein. Oxides of the metals from Group IIA of the Periodic Table for this purpose are discussed in U.S. Pat. No. 3,835,031. Also see U.S. Pat. Nos. 3,699,037, and 3,949,684. Similar use of cerium oxide is shown by U.S. Pat. No. 4,001,375.

SUMMARY OF THE INVENTION

The efficiency of removing $SO_x$ from FCC flue gas by the foregoing techniques is improved by contacting the flue gas with the catalyst at a temperature below that prevailing in the regenerator. That principle is applied in accordance with this invention and the advantages of high temperature regeneration are retained without the noted effects on the reactor by provision of a novel process scheme and apparatus for practicing the same. The flue gas and regenerated catalyst are separately removed from the regenerator, the flue gas is cooled and again contacted with the regenerated catalyst in a vessel apart from the regenerator. After again separating regenerated catalyst from the flue gas, the latter is discharged from the system, preferably after recovery of sensible heat therefrom, and the separated regenerated catalyst is returned to the FCC reactor for further contact with hydrocarbon charge.

DESCRIPTION OF THE DRAWINGS

Typical apparatus for practice of the invention is shown in diagrammatic elevation in the single FIGURE of drawing annexed hereto. As illustrated in that diagram, a hydrocarbon feed 1 such as a gas oil boiling from about 600° F. up to 1000° F. is passed after preheating thereof to the bottom portion of riser 2 for admixture with hot regenerated catalyst introduced by standpipe 3 provided with flow control valve 4. A suspension of catalyst in hydrocarbon vapors at a temperature of at least about 950° F. but more usually at least 1000° F. is thus formed in the lower portion of riser 2 for flow upwardly therethrough under hydrocarbon conversion conditions. The suspension initially formed in the riser may be retained during flow through the riser for a hydrocarbon residence time in the range of 1 to 20 seconds.

The hydrocarbon vapor-catalyst suspension formed in the riser reactor is passed upwardly through riser 2 under hydrocarbon conversion conditions of at least 900° F. and more usually at least 1000° F. before discharge into separation zone 5 about the riser discharge. There may be a plurality of cyclone separator combinations, not shown, comprising first and second cyclonic separation means attached to or spaced apart from the riser discharge for separating catalyst particles from hydrocarbon vapors, as is customary in the art. These hydrocarbon vapors, together with gasiform material separated by stripping gas as defined below, are passed by conduit 6 to fractionation equipment not shown. Catalyst separated from hydrocarbon vapors in the cyclonic separation means is passed to a dense fluid bed of separated catalyst 7 retained about an upper portion of riser conversion zone 2. Catalyst bed 7 is maintained as a downwardly moving fluid bed of catalyst countercurrent to rising stripping gas introduced to a lower portion thereof by conduit 9. Baffles may be provided in the stripping zone to improve the stripping operation.

The catalyst is maintained in stripping zone 8 for a period of time sufficient to effect a higher temperature desorption of feed deposited compounds which are then carried overhead by the stripping gas. The stripping gases with desorbed hydrocarbons pass thrugh the cyclonic separating means wherein entrained catalyst fines are separated and returned to the catalyst bed. The hydrocarbon conversion zone comprising riser 2 may terminate in an upper enlarged portion of the catalyst collecting vessel with the commonly known bird cage discharge device or an open end "T" connection may be fastened to the riser discharge which is not directly connected to the cyclonic catalyst separation means. The cyclonic separation means may be spaced apart from the riser discharge so that an initial catalyst separation is effected by a change in velocity and direction of the discharged suspension so that vapors less encumbered with catalyst fines may then pass through one or more cyclonic separation means before passing to a product separation step. In any of these arrangements, gasiform materials comprising stipping gas, hydrocarbon vapors, and desorbed sulfur compounds are passed from the separation means 5 for removal with hydrocarbon products of the cracking operation by conduit 6. Gasiform material comprising hydrocarbon vapors is passed by conduit 6 to a product fractionation step not shown. Hot stripped catalyst at an elevated temperature is withdrawn from a lower portion of the stripping zone by conduit 10 for transfer to a catalyst regeneration zone, presently to be described.

The regenerator may be of any desired style, but is preferably designed and operated for full CO burning and maximum temperature of regeneration to yield regenerated catalyst at minimum residual coke level after regeneration and a regeneration gas containing significant amount of oxygen, say at least 2% $O_2$ by weight to provide an oxidizing atmosphere in a subsequent step described below. A modern version of regeneration is characterized by "fast fluid" riser to which catalyst suspended in regeneration gas is supplied from a dense fluidized bed undergoing regeneration at high temperature. The spent catalyst from the reactor and hot catalyst separated at the top of the riser are both introduced to the dense fluidized bed where the "fire" for regenerating spent catalyst is lighted by the hot regenerated catalyst so recycled. See U.S. Pat. Nos. 3,893,812 and 3,926,778.

As seen in the annexed drawing, spent catalyst passes by line 10 to an enlarged lower section 11 of the regenerator where it enters a dense fluidized bed maintained by air introduced by conduit 12. Catalyst from the dense bed in section 11 is entrained by hot regeneration gas to pass upward through a riser 13 to discharge port 14 into enlarged disengaging zone 15. Disengaging zone 15 may be equipped with cyclone separators and dip legs, not shown, in the manner usual in this art. The catalyst regenerated at high temperature in section 11 and riser 13 is collected as a fluidized bed in the lower portion of disengaging zone 15 about riser 13. A portion of the hot catalyst collected is recycled by line 16 back to the bed in the lower section 11 for the purpose stated. Another portion, intended for utlimate return to the riser reactor 2, is withdrawn by standpipe 17.

Hot regeneration fume is withdrawn from disengaging zone 15 and passes by line 18 to a heat exchanger 19 where the gaseous products of combustion are cooled, preferably by generation of steam to be used in the process, e.g., in stripper 8, or for an air blower turbine. Cooled regeneration gas in line 20 is now contacted with regenerated catalyst from standpipe 17. That contact may be in a riser to a disengaging zone much like the riser reactor 2 and disengaging zone 5 or the cooled regeneration gas may be the fluidizing agent to the dense fluidized bed 21 in contactor 22. Subsequent to the contact with hot regenerated catalyst, however conducted, the flue gas is freed of entrained catalyst in the usual manner, as by cyclones not shown, and discharged at line 23 through means to recover its sensible heat as steam in boilers, as useful work in turbines or the like, all as is usual in the art, it being noted that the flue gas has been reheated in cooling the regenerated catalyst during the contact just described.

The regenerated catalyst, being of the type described above to have capability of combining with $SO_x$, has adsorbed or reacted with $SO_x$ at the lower temperature prevailing in contactor 22. The degree of such sorption or reaction is a function of $SO_x$ vapor pressure of the combination of $SO_x$ with the catalyst component capable of such combination. In accordance with usual principles, that vapor pressure declines with decreasing temperature. Thus, the catalyst will probably pick up some $SO_x$ in the regenerator and an additional portion at the lower temperature of contactor 22.

The cooling in contactor 22 serves an additional important function in providing control on temperature of catalyst returned to the riser reactor through standpipe 3. The nature of this control will be apparent from consideration of the control of the reactor to a set top temperature by regulating the rate of flow of regenerated catalyst in standpipe 3.

That top temperature is a function of sensible heat of catalyst and feed stock reduced by the endothermic heat of reaction and of vaporization of the hydrocarbon feed. A change in reactor top temperature, sensed by a suitable thermocouple, is compared at temperature controller 24 against a set point, which operates slide valve 4 to increase flow of regenerated catalyst for additional heat supply if reactor temperature drops or decrease catalyst flow when reactor temperature tends to rise. These controls are the major factors in achieving the "heat balanced" principle of FCC operation. As will be seen, these automatic controls which are essential to the "rule of operation" of the unit, impose constraints on freedom of the operator to exert control on a single variable of the operation. For example, when operating in conventional manner, he can change the preheat of the charge, but only if he accepts a reduction in catalyst circulation rate when reactor temperature rises.

Operation according to the present invention enables the operator to cool the returned catalyst to a level at which thermal cracking of the charge is negligible and to vary C/O at will without changing regenerator parameters and hence degree of coke burning.

DESCRIPTION OF SPECIFIC EMBODIMENTS

In preferred embodiments, the invention contemplates circulation in FCC Units of a catalyst inventory which includes an agent capable of reacting with or sorbing $SO_x$ and causing contact of regenerator flue gas with at least a portion of the circulating catalyst inventory under conditions to favor transfer of $SO_x$ from the flue gas to the catalyst inventory. A typical metal sulfate exhibits a vapor pressure which determines the minimum level of $SO_x$ which must exist in the vapor phase for any particular temperature. The higher the temperature, the higher the vapor pressure resulting in a higher concentration of $SO_x$ in the vapor phase at the expense of sulfur bound in the solid catalyst. The amount of sulfur converted to $H_2S$ by reduction in the reducing atmosphere of the reactor is constrained to an amount not greater than that conveyed to the FCC reactor reducing atmosphere as combination with the catalyst inventory components.

That constraint is avoided in large part and other advantages obtained by passing at least a portion of the regenerated catalyst discharged at high temperature from the regenerator in contact with a cooled stream of regenerator flue gas whereby catalyst and flue gas are contacted at a lower temperature (lower $SO_x$ vapor pressure) than that prevailing in the regenerator proper.

It is preferred that the reduced temperature contact of regenerated catalyst with flue gas be on a full flow basis, that is the total stream of regenerated catalyst be contacted at reduced temperature with the total stream of flue gas as shown in the annexed drawing. The invention will be further discussed with respect to that full flow basis, but it will be apparent to those skilled in the art how the invention may be applied to a lesser stream of flue gas, a lesser stream of regenerated catalyst or both by diverting a portion of flue gas directly to heat recovery and stack and/or a portion of regenerated catalyst directly to the reactor.

For the purposes discussed, the invention contemplates conveying the flue gas, in whole or part, through a heat exchange zone, such as steam generator 19, to reduce the temperature thereof by an amount such that, on contact with hot regenerated catalyst, the mixture will be at a temperature at least 10° F., below the temperature at which flue gas and catalyst were separated in disengaging zone 15. Generally, this will require that temperature of the flue gas be reduced by about 100° F. or more in the heat exchanger, a value subject to variation depending on the proportions of flue gas and regenerated catalyst again contacted after separation in the regenerator. In a preferred mode, the regenerator is operated to maintain a temperature of at least about 1200° F. up to about 1375° F., at the point of separating flue gas from regenerated catalyst and the flue gas will be cooled to a temperature below about 500° F. Upon contacting flue gas at 400°–500° F. with regenerated catalyst at 1300° F., the temperature of the mixture will be in the range of 1170°–1200° F., assuming regeneration air in an amount to achieve major conversion of CO in the regenerator to $CO_2$, i.e., to less than 1000 ppm CO in the flue gas. Such essentially complete combustion of CO usually requires an excess of oxygen resulting in an oxygen content in the flue gas of 1–2%.

It will be apparent that a catalyst inventory capable of binding $SO_x$ will take up those compounds in the regenerator in an amount to approximate thermodynamic equilibrium with the regenerator flue gas from which it is separated in disengaging zone 15. At the lower temperature of contact with cooled regenerator flue gas, the catalyst inventory will no longer be in equilibrium with the flue gas and will pick up additional $SO_x$ to approach a new equilibrium at the new temperature of contact.

It will also be apparent that, from a theoretical viewpoint, it is immaterial whether cooling be applied to the flue gas, the regenerated catalyst or both. The net effect of renewed contact at lower temperature will necessarily be the same. However, for practical reasons of heat transfer efficiency, it is preferred that cooling be applied to the flue gas if the desired degree of cooling can be so effected while maintaining an efficient temperature differential across heat transfer surfaces.

The degree of cooling from regenerator temperature to that of the renewed contact of catalyst and flue gas will be significant, at least 25° F. in order that acceptance of $SO_x$ by the catalyst in the renewed contact shall be a significant amount over that taken up in the regenerator. Minimum temperature of the renewed contact will be determined by the heat demand of the riser reactor to vaporize charge, heat charge to reaction temperature and supply endothermic heat of reaction, taking into accout the degree of preheat applied to the charge before admission to the riser reactor. It will be remembered that thermal cracking of the charge is to be avoided in order to gain maximum catalyst selectivity and quality advantage (octane number) of gasoline produced in the unit. For that reason, charge preheat is limited to temperature below about 750° F. For like reason, it is advantageous to reduce temperature of the renewed contact between regenerated catalyst and regeneration flue gas, in addition to the advantage in $SO_x$ uptake at reduced temperature.

To summarize, it is advantageous to regenerate the catalyst at high temperature, preferably in the range of 1200° to 1375° F. and the art is presently moving to even higher regeneration temperatures to achieve the more extensive removal of coke and improvement in activity and selectivity of catalyst so attainable. These high regeneration temperatures impair the capacity of the catalyst to remove $SO_x$ from the flue gas and tend to result in thermal cracking of charge and low C/O in the reactor to the detriment of gasoline yield and quality. By the single step of contacting regenerated catalyst and flue gas at reduced temperature, all these difficulties are reduced in magnitude to an extent dependent on the degree of temperature reduction. These advantages are particularly important in units using zeolite cracking catalyst because of the sensitivity of that catalyst to residual coke levels, a factor which is best satisfield by high temperature regeneration.

The solid reactants which result in reduction of $SO_x$ in regenerator flue gas have received extensive discussion in patents and the technical literature as cited above. Such reactants may be incorporated in the catalyst inventory as separate particles distinct from the cracking catalyst to circulate therewith but are preferably formed as an integral part of the cracking particles. A preferred form of catalyst is prepared by treatment with a caustic solution of a specially prepared high alumina complex derived from clay. The treatment develops crystalline aluminosilicate zeolite within the clay derived mass. Upon suitable ion exchange treatment, the complex becomes a stable cracking catalyst of high activity and selectivity. The residual alumina of the composite appears to be responsible for the capacity of the catalyst to remove $SO_x$ from regenerator flue gas. Preparation and activation of such catalysts are described in greater detail by U.S. Pat. Nos. 3,506,594, 3,647,718, and 3,657,154; the entire disclosure of each being herein incorporated by this reference.

A large number of oxides and combinations of oxides for reaction with $SO_x$ are described in the prior art. These are all capable of benefit from utilization in accordance with the principles of this invention. In general, these compounds are stable solids at the temperature of the FCC regenerator in that they do not melt, sublime, or decompose at such temperatures. The usable oxides are thermodynamically capable of absorbing $SO_x$ upon renewed contact between regenerated catalyst and flue gas at the temperature of such contact (less than maximum regenerator temperature) in an oxidizing atmosphere. The resultant sulfur compounds are capable of reduction by hydrocarbons at the cracking temperature of the reactor, say 850°-1000° F., to produce $H_2S$ and thus regenerate the adsorption properties of the oxides for $SO_x$ in an oxidizing atmosphere.

Among the oxides earlier described for the purpose in addition to the alumina preferred herein, mention may be made of oxides of Group IIA metals, typified by magnesium set forth in U.S. Pat. Nos. 3,835,031 and 3,699,037; cerium oxides as described in U.S. Pat. No. 4,001,375; and the several metal components described in German Offenlegungschrift DT 2657403 including compounds of sodium, scandium, titanium, iron, chromium, molybdenum, magnesium, cobalt, nickel, antimony, copper, zinc, cadmium, rare earth metals and lead. They are of varying effectiveness at different temperatures and will be applied to or mixed with the cracking catalyst as the conditions of a particular situation may indicate and applying the knowledge and skill of the art. Techniques for incorporating the desired compound will include impregnation with a salt decomposable to the oxide, mulling the additive oxide with the cracking catalyst components, spray drying a slurry of mixed components and the like.

For best results, it is preferred that regeneration be conducted for substantially complete CO burning (flue gas of less than 1000 ppm CO) in the regenerator under conditions to impart the heat of CO combustion to the catalyst since that technique permits burning to very low residual coke levels, such as 0.1%, and high temperature of regenerated catalyst, on the order of 1300° F. The preferred mode of achieving the result is CO burning in the regenerator dense bed with the aid of a catalyst promoted for that purpose by a small amount of metal from period 5 or 6 of Periodic Table Group VIII, e.g., 1–5 ppm of platinum.

In a typical operation according to the invention, the catalyst is formulated in the manner described in U.S. Pat. No. 4,071,436, thus providing alumina capable of sorbing $SO_x$ in the oxidizing atmosphere of the regenerator and of decomposing in the reducing atmosphere of the reactor to release the sulfur as $H_2S$ and regenerate the $SO_x$ sorption capability. The catalyst may be impregnated with an amount of an aqueous solution of a platinum ammine compound to provide 4 ppm of platinum metal based on dry weight of the catalyst. When that catalyst is employed for riser cracking of a gas oil at 950° F., the products include a high yield of good quality motor gasoline. The catalyst is separated from hydrocarbon reaction products and $H_2S$ and stripped with steam to remove volatiles. The stripped catalyst is regenerated with an amount of air to provide oxygen for substantially complete combustion to low levels of CO at a regenerator top temperature of about 1300° F. Flue gas is separated from the regenerated catalyst at the temperature and is cooled to 400° F. and again contacted with the hot regenerated catalyst to provide a mix temperature of approximately 1200° F. At this reduced temperature of contact, the catalyst sorbs a significant amount of $SO_x$ over and above that sorbed in the regenerator and is then stripped and returned to the riser reactor.

The process in its preferred form thus provides for significant reduction in CO and $SO_x$ emissions while making available to the operator an additional controllable variable for adjustment of the cracking reaction. That additional control is achieved by adjusting the temperature of contacting regenerated catalyst with flue gas which had been separated therefrom to control the amount of hot regenerated catalyst contacted with hydrocarbon charge.

What we claim is:

1. In a process for catalytic cracking of a sulfur containing hydrocarbon charge by contacting said charge at cracking temperature with a circulating inventory of cracking catalyst which inventory includes a component capable of sorbing oxides of sulfur in an oxidizing atmosphere and of reaction in a reducing atmosphere to release sulfur as hydrogen sulfide whereby the catalyst acquires an inactivating carbonaceous deposit containing sulfur, separating vaporous products of reaction including hydrogen sulfide from circulating catalyst inventory containing said deposit, regenerating the so separated inventory by contact with air at a temperature to burn said carbonaceous deposit thus generating oxides of carbon and sulfur and regenerating the catalyst, separating products of combustion from regenerated catalyst and returning regenerated catalyst to renewed contact with hydrocarbon charge with reduction of sulfur associated with the regenerated catalyst;

the improvement which comprises again contacting said products of combustion and said regenerated catalyst at a temperature substantially below the temperature of regeneration to thereby induce sorption by said catalyst inventory being returned to contact with said charge of an amount of sulfur oxides greater than that sorbed during said regeneration, and to return said regenerated catalyst to contact with said charge at a temperature substantially below the temperature of said regeneration.

2. A process according to claim 1 wherein said products of combustion are cooled after said separation from regenerated catalyst and thereafter again contacting said cooled products of combustion and said regenerated catalyst as aforesaid to cool said regenerated catalyst to a temperature substantially below the temperature of said regeneration.

3. A fluid catalytic cracking process according to claim 1 or claim 2 wherein said contact with hydrocarbon charge and said contact with air are conducted by suspending the catalyst inventory in charge and in air, respectively.

4. A process according to claim 3 wherein the contact of regenerated catalyst with hydrocarbon charge is conducted in a riser and the amount of hot regenerated catalyst so contacted is controlled to maintain a preset top temperature of the riser.

5. A process according to claim 4 wherein the temperature of said again contacting is adjusted to control the amount of hot regenerated catalyst contacted with hydrocarbon charge.

* * * * *